Jan. 18, 1927.
E. B. PARSONS ET AL
1,614,685
PROCESS FOR PRODUCING CARBON BLACK FROM NATURAL GAS
Filed May 19, 1925
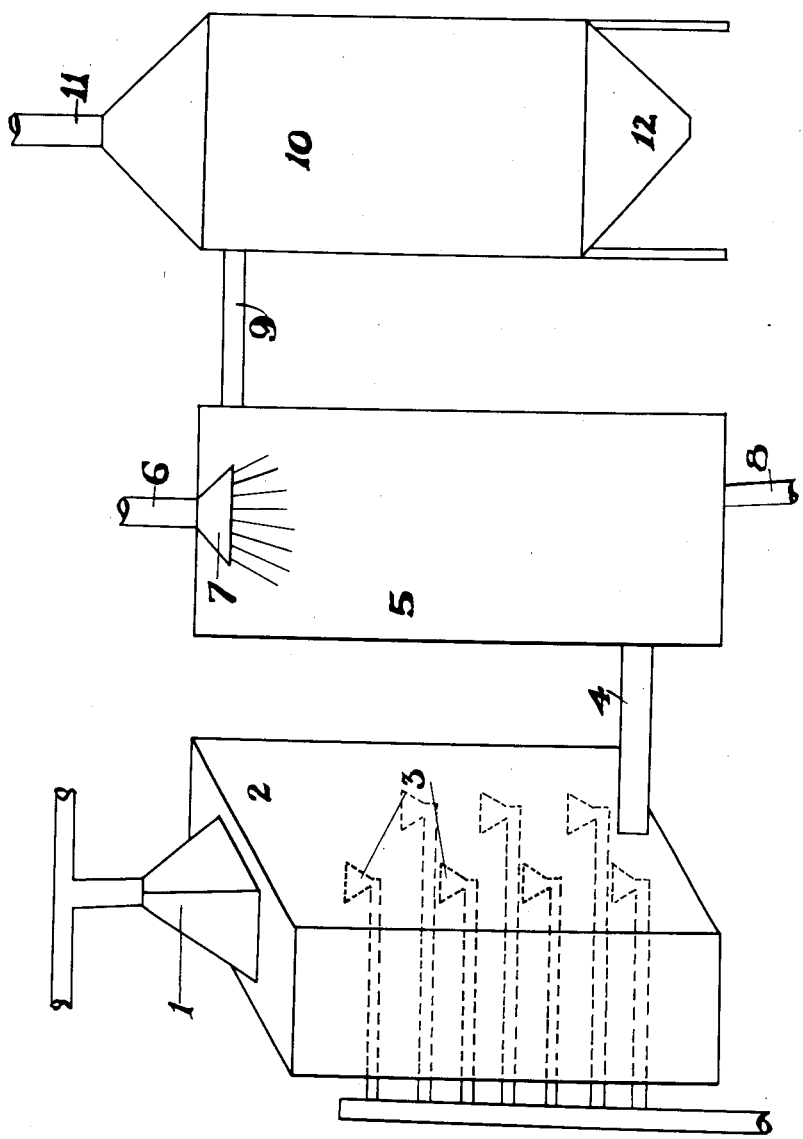
Inventors.
Edward B. Parsons,
William D. Inskeep, and
William Hunt,
By
J.E. Fabricco,
attorney Patented Jan. 18, 1927.

1,614,685

UNITED STATES PATENT OFFICE.

EDWARD B. PARSONS AND WILLIAM D. INSKEEP, OF SAN FRANCISCO, CALIFORNIA, AND WILLIAM HUNT, OF BALTIMORE, MARYLAND.

PROCESS FOR PRODUCING CARBON BLACK FROM NATURAL GAS.

Application filed May 19, 1925. Serial No. 31,422.

This invention relates to a process for producing carbon black, sometimes known as gas black, from natural gas, and pertains directly to an economical and convenient way for dissociating the elements comprising natural gas so that carbon black is produced.

An object of this invention is to provide a convenient and economical process for dissociating the elements comprising natural gas so that carbon black may be produced.

Another object of this invention is to provide a suitable process for the production of carbon black from natural gas.

Briefly, the invention consists in passing natural gas through a flame, subjecting the heated gas mixture to aqueous liquid spray, and collecting the carbon black, formed by the action of the flame, after its dissociation from the other elements composing the gas mixture.

In describing this invention it is necessary to generally describe the apparatus used in carrying out the process, and for that reason, only the important features of the apparatus are shown on the drawing.

In the said drawing the figure represents the apparatus used in producing carbon black from natural gas or oil vapors.

Referring to the drawings, 1 represents an intake manifold through which natural gas passes into furnace 2. Furnace 2 is provided with a plurality of burners 3, which may be adapted to burn gas, oil or wood, it only being necessary in carrying out this invention that a suitable flame be furnished to approximately fill the inside of the furnace 2. In practise the furnace 2 may be smaller in dimensions than the one shown in the drawings, it being sufficient to provide a furnace in which a flame from one or more burners occupies the greater part of the area located within the walls thereof. Leading from the furnace 2 is pipe 4 through which the heated gas composition passes to cooling chamber 5. Cooling chamber 5 may be constructed so as to assume any desirable shape, and into the top thereof is a pipe 6, at the end of which, inside the said chamber, is provided a suitable spray 7. Water or other aqueous liquid is led through pipe 6 and sprayed inside the said chamber 5, by means of the spray 7. The bottom of the chamber 5 is provided with a suitable lead 8 through which the water or aqueous liquid passes from the cooling chamber. The cooling chamber 5 is provided with a lead 9 through which the gas mixture is permitted to pass to collector 10. Collector 10 is constructed from any suitable material such as heavy canvas, and is provided at the top with a pipe 11, which serves as a means for allowing the gas composition to pass. At the bottom of 10, is a funnel 12 where the carbon black is collected.

Natural gas which is composed of gases of the hydrocarbon group or groups, with or without natural impurities, is forced into furnace 2 at intake manifold 1. It passes through the flame, made by burners 3, and the carbon that formed a part of the natural gas is liberated therefrom. The residue and flue gases, namely, nitrogen, carbon dioxide and monoxide, steam and hydrogen, pass from the furnace 2 through pipe 4 into cooling chamber 5, where a spray of aqueous liquid or solution is constantly dropping from spray 7. The quick cooling of the gases causes the carbon carried therein to form suspended carbon which assumes the form of fine, powdered carbon particles.

The remaining gases, and the carbon particles pass through lead 9 into the collector 10. The carbon black, which is the powdered carbon, heretofore suspended in the aforenamed gases in cooling chamber 5, drops into funnel 12, while the remaining gases, namely hydrogen, nitrogen, steam, carbon monoxide and carbon dioxide, pass through pipe 11 where they may be treated further in order to produce certain byproducts.

Having thus described our invention what we claim and desire to secure by Letters Patent is:

1. A process for producing carbon black from natural gas which comprises, passing natural gas through a flame and thereby liberating the carbon from the natural gas, spraying the same with an aqueous solution, and collecting the carbon.

2. A process for producing carbon black from natural gas which comprises, freeing the carbon from the natural gas by interacting the natural gas with a flame, and separating the carbon formed from the residue gases by applying a liquid spray to the mixture of gases.

3. A process for producing carbon black from natural gas which comprises, forcing natural gas into a furnace having a flame therein, freeing the carbon from the natural gas by passing the same through the flame, cooling the residue gases by means of a liquid spray whereby the carbon is separated from the gases formed by the action of the flame on the natural gas.

4. A process for producing carbon black from natural gas which comprises, dissociating the carbon from the natural gas by firstly passing the natural gas into direct contact with a flame and secondly, subjecting the residuary mixture to a liquid spray to separate the dissociated carbon from the other gases.

5. In a process for producing carbon from natural gas which comprises the step of passing the natural gas directly through a flame and thereby dissociating the carbon from the natural gas.

6. In a process for producing carbon from natural gas which comprises the step of causing natural gas to come into direct contact with a flame, whereby carbon is separated from the natural gas.

7. In a process for producing carbon from natural gas which comprises, passing natural gas directly through a flame to dissociate the carbon from the other constituents of the natural gas, and then separating the carbon from the gases formed by the action of the flame on the natural gas by cooling the mixture.

EDWARD B. PARSONS.
WILLIAM D. INSKEEP.
WILLIAM HUNT.